US008272114B2

(12) United States Patent
Yang et al.

(10) Patent No.: US 8,272,114 B2
(45) Date of Patent: Sep. 25, 2012

(54) CONNECTOR COVER ASSEMBLING SYSTEM

(75) Inventors: Yi-chang Yang, Tu Cheng (TW); Kuo-chuan Chiu, Tu Cheng (TW); Feng-chi Lee, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 260 days.

(21) Appl. No.: 12/876,104

(22) Filed: Sep. 3, 2010

(65) Prior Publication Data

US 2012/0054995 A1 Mar. 8, 2012

(51) Int. Cl.

| | |
|---|---|
| ***B23Q 1/00*** | (2006.01) |
| ***B23Q 3/00*** | (2006.01) |
| ***B23Q 7/04*** | (2006.01) |
| ***H01R 9/22*** | (2006.01) |
| ***H01R 13/58*** | (2006.01) |
| ***H01R 4/24*** | (2006.01) |
| ***H01R 4/26*** | (2006.01) |
| ***H01R 11/20*** | (2006.01) |
| *B23P 19/04* | (2006.01) |

(52) U.S. Cl. ........... 29/283; 439/470; 439/404; 439/718

(58) Field of Classification Search .................... 29/283; 439/470, 718, 404, 630, 607.05, 135

See application file for complete search history.

(56) References Cited

U.S. PATENT DOCUMENTS 4,536,935 A * 8/1985 Wyle et al. .................... 29/281.1
5,391,092 A * 2/1995 Sumida .......................... 439/470
5,634,763 A * 6/1997 Fryc ............................ 414/751.1
5,893,773 A * 4/1999 Dellinger ....................... 439/404
5,908,327 A * 6/1999 Tsuji et al. ..................... 439/470
5,944,561 A * 8/1999 McCleerey et al. ........... 439/718
6,095,868 A * 8/2000 Hyland et al. ................. 439/630
6,115,257 A * 9/2000 Laity ............................. 361/737
6,123,554 A * 9/2000 Ortega et al. ................... 439/79
6,129,574 A * 10/2000 Okayasu et al. .............. 439/404
6,132,230 A * 10/2000 Shinozaki et al. ............ 439/281
6,428,347 B1 * 8/2002 Johnson et al. ............... 439/492
6,485,332 B1 * 11/2002 Kwang .......................... 439/587
7,138,580 B2 * 11/2006 Boutin ........................ 174/84 R
7,524,215 B2 * 4/2009 Banas et al. .................. 439/731
7,588,462 B2 * 9/2009 Ngo ......................... 439/607.05
7,806,717 B2 * 10/2010 Nakano ......................... 439/367
2001/0024901 A1 * 9/2001 Toda ............................. 439/357
2004/0166723 A1 * 8/2004 Kumamoto et al. .......... 439/470
2004/0171288 A1 * 9/2004 Banas et al. .................. 439/135
2006/0237214 A1 * 10/2006 Boutin ............................ 174/92
2006/0240706 A1 * 10/2006 Boutin .......................... 439/521
2008/0240659 A1 * 10/2008 Kopp .............................. 385/88
2008/0280467 A1 * 11/2008 Tsuji ............................. 439/135
2010/0055963 A1 * 3/2010 Nakano ......................... 439/367
2010/0142895 A1 * 6/2010 Hsu ................................ 385/75

* cited by examiner

*Primary Examiner* — Lee D Wilson
*Assistant Examiner* — Alvin Grant
(74) *Attorney, Agent, or Firm* — Cheng-Ju Chiang

(57) ABSTRACT

A connector cover assembling system includes an arrangement apparatus, which aligns covers and includes a transporting channel for transporting the covers to a frame that supports the covers and associated connector bodies. A cover driving member transports the covers one by one from the frame to a separating mechanism, which further transports the cover to a location above a clamping mechanism for being clamped by the clamping mechanism. A lifting mechanism drives an inserting mechanism and the clamping mechanism to the separating mechanism. The clamping mechanism clamps the covers from the separating mechanism. The inserting mechanism drives the clamping mechanism to transport and assemble the cover to the connector body. A holding mechanism holds the connector body during the assembling operation. The control unit coordinates operations of the above-mentioned components. Therefore, manufacturing efficiency of electrical connector can be improved and manufacturing costs reduced.

8 Claims, 16 Drawing Sheets

CONNECTOR COVER ASSEMBLING SYSTEM

BACKGROUND OF THE INVENTION

1. Field of the Invention

The present invention generally relates to a connector cover assembling system, and particularly to a connector cover assembling system for assembling a cover to a connector body of a flexible printed circuit connector.

2. Description of Prior Art

Due to the progress of human society, continuous economic development and increasing requirements of upgraded living standard, various electronic products having a compact size and light weight are more and more widely used. Therefore, more and more manufacturers are dedicated to manufacture electronic products with light weight, high performance, high precision and high quality so as to increase market share. Flexible printed circuit (FPC) connectors are one of such electronic products.

An FPC connector is illustrated in FIG. 14. The FPC connector, which is generally designated at 2, comprises a cover 21, conductive terminals 202, and a mounting base or insulation housing 201 that receives and retains the conductive terminals 202 therein. In assembling the connector, the conductive terminals 202 are first fitted into the mounting base 201 to form a connector body 20 and then the cover 21 of the FPC connector 2 is assembled on the connector body 20 to complete the assembling of the FPC connector 2. Currently, above-mentioned assembling process is entirely performed with human labor by human hands.

In assembling an FPC connector, the operation of assembling the cover 21 to the connector body 20 is the most critical step and the most difficult process. When the FPC connectors are made increasingly small to meet the light-weight and fashion requirements of FPC connector, manual assembling of the connector bodies and covers increase labor intensity and are inefficient. On the other hand, the manually assembled FPC connectors are generally different from one another and are of low quality.

SUMMARY OF THE INVENTION

To solve the above-mentioned problems, an objective of the present invention is to provide a connector cover assembling system, which is capable of improving manufacturing efficiency and decreasing manufacturing costs, and the connectors assembled by the connector cover assembling system are reliable and of consistent quality.

To achieve the above objective, the invention provides a connector cover assembling system for assembling a cover of an FPC connector on a connector body of the FPC connector. The connector cover assembling system comprises an arrangement apparatus, a frame, a cover driving member, a separating mechanism, a lifting mechanism, an inserting mechanism, a clamping mechanism, a holding mechanism, and a control unit.

The arrangement apparatus functions to align and arrange connector covers loaded therein and comprises a transporting channel for transporting the covers to the frame.

The frame comprises a mounting panel, a supporting channel for carrying and supporting the covers, and a mounting channel for carrying and supporting a connector body. The supporting channel is located on a side of the mounting panel and is jointed to the transporting channel for transporting the covers from the arrangement apparatus to the supporting channel of the frame. The mounting channel is adjacent to the supporting channel and is substantially perpendicular to the mounting panel.

The separating mechanism comprises a separating driver and a separating mechanism body. The separating mechanism body defines a receiving cavity in an end thereof for connecting the supporting channel. The cover driving member drives the covers to be transported along supporting channel from the supporting channel to the receiving cavity. The separating mechanism body has an opposite end connecting with the separating driver. The separating driver is mounted on an upper end of the mounting panel and drives the separating mechanism body to horizontally move along the mounting channel of the frame.

The lifting mechanism is located below the separating mechanism and comprises a first lifting driver and a lifting sliding plate assembly. The first lifting driver is mounted on a lower end of the mounting panel and connects with the lifting sliding plate assembly. The lifting sliding plate assembly is positioned on the mounting panel. The first lifting driver drives the lifting sliding plate assembly to vertically move along the separating mechanism.

The inserting mechanism is positioned on the lifting sliding plate assembly and is located below the separating mechanism. The inserting mechanism comprises an insertion driver, an insertion sliding plate, an insertion sliding base, and a cam plate. The insertion driver is retained on the lifting sliding plate assembly and connects with the insertion sliding plate. The insertion sliding plate comprises an end mounted on the lifting sliding plate assembly and an opposite end extending through the insertion sliding base for guiding the insertion sliding base to vertically move along the separating mechanism. The cam plate is mounted on the lifting sliding plate assembly and engages the insertion sliding base. When the insertion driver drives the insertion sliding plate to horizontally move a specific distance along the mounting channel of the frame, the cam plate lifts the insertion sliding base along a curved path.

The clamping mechanism is retained on the insertion sliding base of the inserting mechanism and is located below the separating mechanism. The clamping mechanism comprises a clamping driver, a male clamp member, and a female clamp member mating the male clamp member. The clamping driver is mounted on an end of the insertion sliding base. The female clamp member is mounted on another end of the insertion siding base. The male clamp member has an end pivoted to the female clamp member and an opposite end connecting the clamping driver. The clamping driver drives the male clamp member to rotate with respect to the female clamp member, thereby clamping the cover located in the separating mechanism for assembling the cover to the connector body located in the mounting channel.

The holding mechanism is positioned on the frame and holds the connector body which is located in the mounting channel. The holding mechanism comprises a holding driver and a holding member. The holding driver connects with an end of the holding member. The holding member defines a holding gap in an opposite end thereof. The holding driver drives the holding member to move within the mounting channel. The holding gap of the holding member receives and retains the connector body, whereby the connector body is assembled with the cover clamped by the clamping mechanism.

The control unit is electrically connected to the arrangement apparatus, the cover driving member, the separating driver, the first lifting driver, the insertion driver, the clamping driver, and the holding driver.

As stated previously, the connector cover assembling system according to the present invention utilizes the vibration plate to align and arrange disorderly covers of FPC connectors loaded therein and transports ordered covers to the frame. Afterward, the high-pressure gas source drives the covers in the frame to move to the separating mechanism. The separating mechanism transports the covers, one by one, to a location above the clamping mechanism. Then, the lifting mechanism drives both the inserting mechanism and the clamping mechanism to move therewith along the separating mechanism. The clamping mechanism clamps the cover located in the separating mechanism. Finally, the holding mechanism securely holds the connector body located in the frame. The inserting mechanism drives the clamping mechanism in a curved path to rapidly mount the cover to the connector body in the frame, thereby steadily and reliably mounting the cover to the connector body. Therefore, the connector cover assembling system according to the present invention is capable of improving manufacturing efficiency and decreasing manufacturing costs. Besides, the connectors assembled by the connector cover assembling system are reliable and of consistent quality.

BRIEF DESCRIPTION OF THE DRAWINGS

The present invention may best be understood through the following description with reference to the accompanying drawings, wherein.

DETAILED DESCRIPTION OF THE PREFERRED EMBODIMENT

Figure 1:
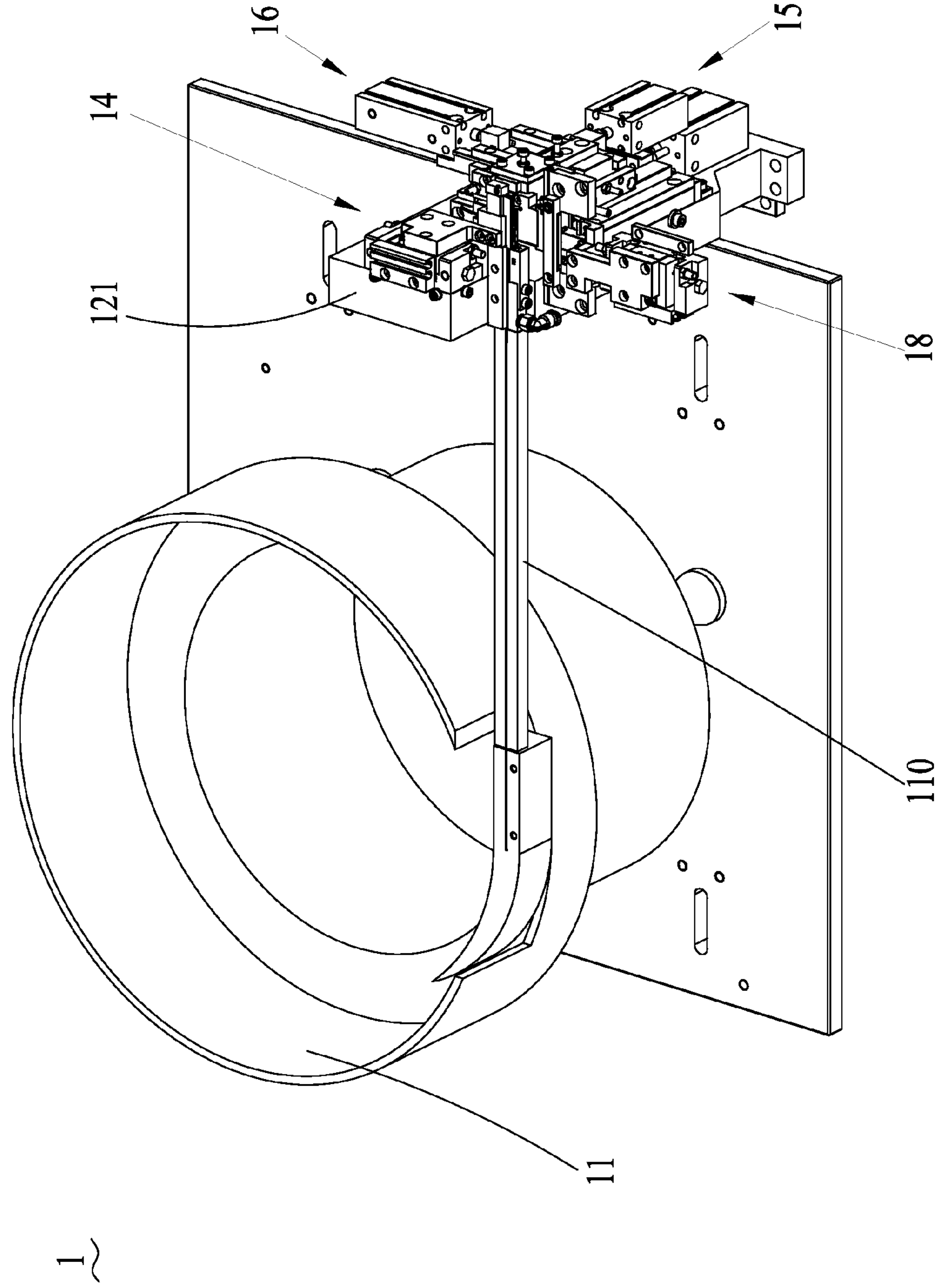
FIG. 1 is a perspective view of a connector cover assembling system according to an embodiment of the present invention.

Referring to FIGS. 1-3 and 14-16, a connector cover assembling system according to the present invention, generally designated at 1, is provided for automatically assembling a cover 21 and a connector body 20 of a flexible printed circuit (FPC) connector 2. The connector body 20 consists of conductive terminals 202 and a mounting base 201.

The connector cover assembling system 1 comprises an arrangement apparatus, a frame, a cover driving member, a separating mechanism 14, a lifting mechanism 15, an inserting mechanism 16, a clamping mechanism 17, a holding mechanism 18, and a control unit (not shown). In the instant embodiment, the cover driving member comprises a high-pressure gas source. The arrangement apparatus comprises a vibration plate 11. The vibration plate 11 is provided for aligning disorderly covers 21 of the connectors 2 and then transporting ordered covers 21 to the frame. The frame functions to receive and support the connector bodies 2, and the covers 21 transported from the vibration plate 11. The high-pressure gas source transports the cover 21, which is received in the frame, to the separating mechanism 14. The separating mechanism 14 receives the cover 21 from the frame and transports the cover 21 along the connector body 20 received in the frame to a location above the clamping mechanism 17. At this point, the lifting mechanism 15 drives both the inserting mechanism 16 and the clamping mechanism 17 to move therewith along the separating mechanism 14. The clamping mechanism 17 clamps and picks up the cover 21 from the separating mechanism 14. Then, the holding mechanism 18 holds the connector body 20, thereby ensuring reliable assembling of the connector body 20 and the cover 21. Now, the inserting mechanism 16 begins to drive the clamping mechanism 17 to move along the connector body 20 in the frame and to insert the cover 21 clamped by the clamping mechanism 17 onto the connector body 20 in the frame. The control unit controls and coordinates movements/operations of the vibration plate 11, the high-pressure gas source, the separating mechanism 14, the clamping mechanism 17, the lifting mechanism 15, inserting mechanism 16, and the holding mechanism 18, thereby ensuring security and reliability on assembling the cover 21 and the connector body 20 of an FPC connector 2. Detailed description is as follows.

Referring to FIG. 1, the vibration plate 11 comprises a transporting shelf 110. The transporting shelf 110 defines a transporting channel (not labeled), through which the vibration plate 11 transports the ordered covers 21 to the frame. The transporting shelf 110 comprises an end connecting with the frame.

Referring to FIGS. 2, 3, 12, and 13, the frame comprises a mounting panel 121, which is substantially perpendicular to a horizontal ground, a supporting channel 120 for supporting a cover 21, and a mounting channel 122 for supporting a connector body 20. The supporting channel 120 is located on the left side of the mounting panel 121 and engages an end of the transporting shelf 110 of the vibration plate 11 for transporting the covers 21 located in the vibration plate 11 to the frame. A plurality of channel pieces 124 are assembled together to define the mounting channel 122. The mounting channel 122 is positioned on the left side of the supporting channel 120 and is substantially parallel to the horizontal ground. Further, the mounting channel 122 is arranged to be substantially perpendicular to the mounting panel 121. The channel pieces 124 that define the mounting channel 122 are located slightly higher than the separating mechanism 14 in a vertical direction for facilitating assembling the cover 21 and the connector body 20.

Referring to FIGS. 2-5, the separating mechanism 14 comprises a separating driver and a separating mechanism body 142. In the instant embodiment, the separating driver comprises a separating cylinder 141. The separating cylinder 141 is mounted on the mounting panel 121 for driving the separating mechanism body 142 to horizontally move along the mounting channel 122 of the frame to a location above the clamping mechanism 17, thereby facilitating the clamping mechanism 17 clamping and picks up a cover 21 from the separating mechanism 14. The separating mechanism body 142 comprises a lower baffle plate 1421, an upper hold-down plate 1422, an elastic element (now shown), and a sensor 1423. The lower baffle plate 1421 defines a receiving cavity 1425 in a side surface of an end thereof corresponding to the supporting channel 120 of the frame. The lower baffle plate 1421 comprises an opposite end securely connecting with a separating cylinder piston rod 143. The upper hold-down plate 1422 comprises an end pivoting to the lower baffle plate 1421 via a hold-down plate pivot pin 144, and an opposite end positioning on the receiving cavity 1425 of the lower baffle plate 1421 to define a receiving space 1420. The elastic element is positioned between the upper hold-down plate 1422 and the lower baffle plate 1421 so that the upper hold-down plate 1422 elastically presses the lower baffle plate 1421. The sensor 1423 is positioned on the receiving space 1425 and is electrically connected to the control unit for detecting whether the cover 21 in the supporting channel 120 of the frame is transported to a predetermined position of the lower baffle plate 1421 and for feeding back a signal to the control unit. The control unit controls movement/operation of the separating cylinder 141.

The lower baffle plate 1421 defines a plurality of clamping passages 1424 through which a male clamp member 172 and a female clamp member 173 hold a cover 21. The clamping passages 1424 are in communication with the receiving cavity 1425. The lower baffle plate 1421 comprises a location baffle 1426 on a right side of the receiving cavity 1425 thereof for further securing a right side of the cover 21 located in the separating mechanism 14. The location baffle 1426 is coupled to the lower baffle plate 1421 in a releasable manner for facilitating assembling and adjustment of the location baffle 1426. In order to secure left side of the cover 21 located in the separating mechanism 14, the frame comprises an elastic pressing plate 123 arranged adjacent to the supporting channel 120 for preventing the cover 21 from undesirably shifting toward the supporting channel 120 of the frame during the clamping mechanism 17 clamping and picking up the cover 21 from the separating mechanism 14. The elastic pressing plate 123 comprises an end pivoted to the mounting panel 121 of the frame and an opposite end extending outside the mounting panel 121 to elastically engage and securely hold the cover 21, which is transported from the separating mechanism 14 and is adjacent to the supporting channel 120. As a result, the cover 21 is stably held in the separating mechanism 14 to be clamped and picked up by the clamping mechanism 17.

Figure 2:
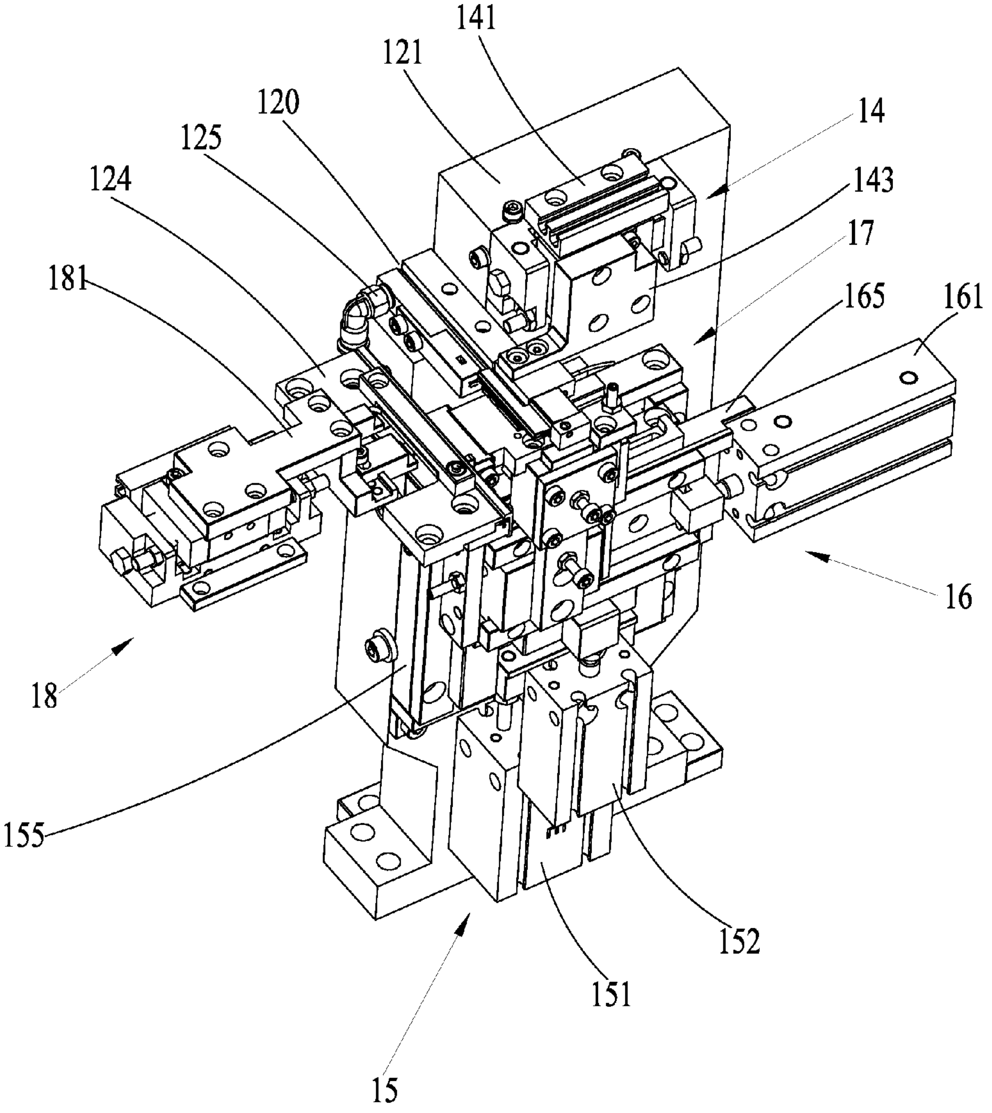
FIG. 2 is another perspective view of the connector cover assembling system shown in FIG. 1 with a vibration plate removed.
Figure 3:
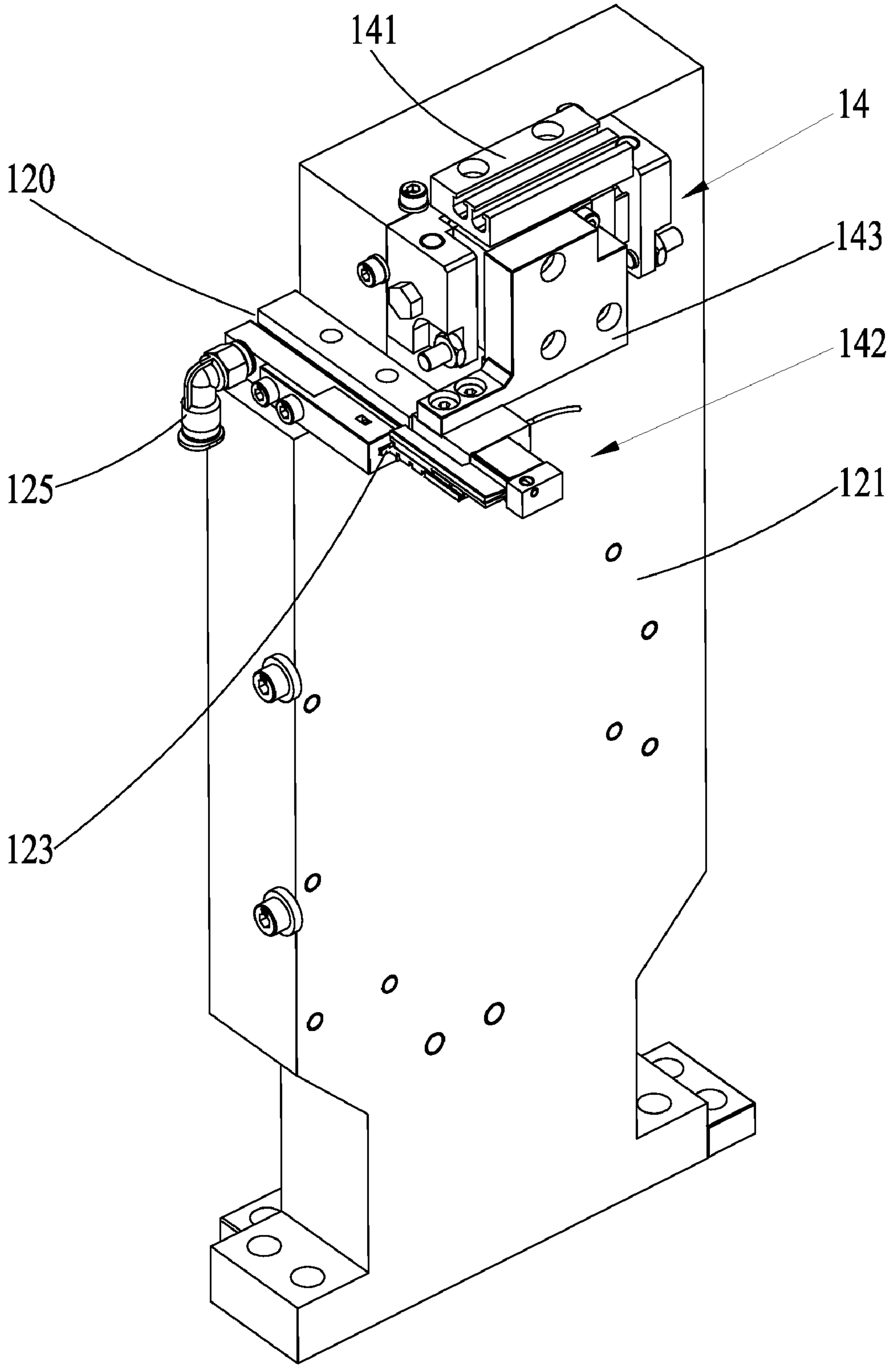
FIG. 3 is a perspective view of a separating mechanism and a mounting panel of the connector cover assembling system shown in FIG. 1, wherein the separating mechanism is mounted on the mounting panel.
Figure 4:
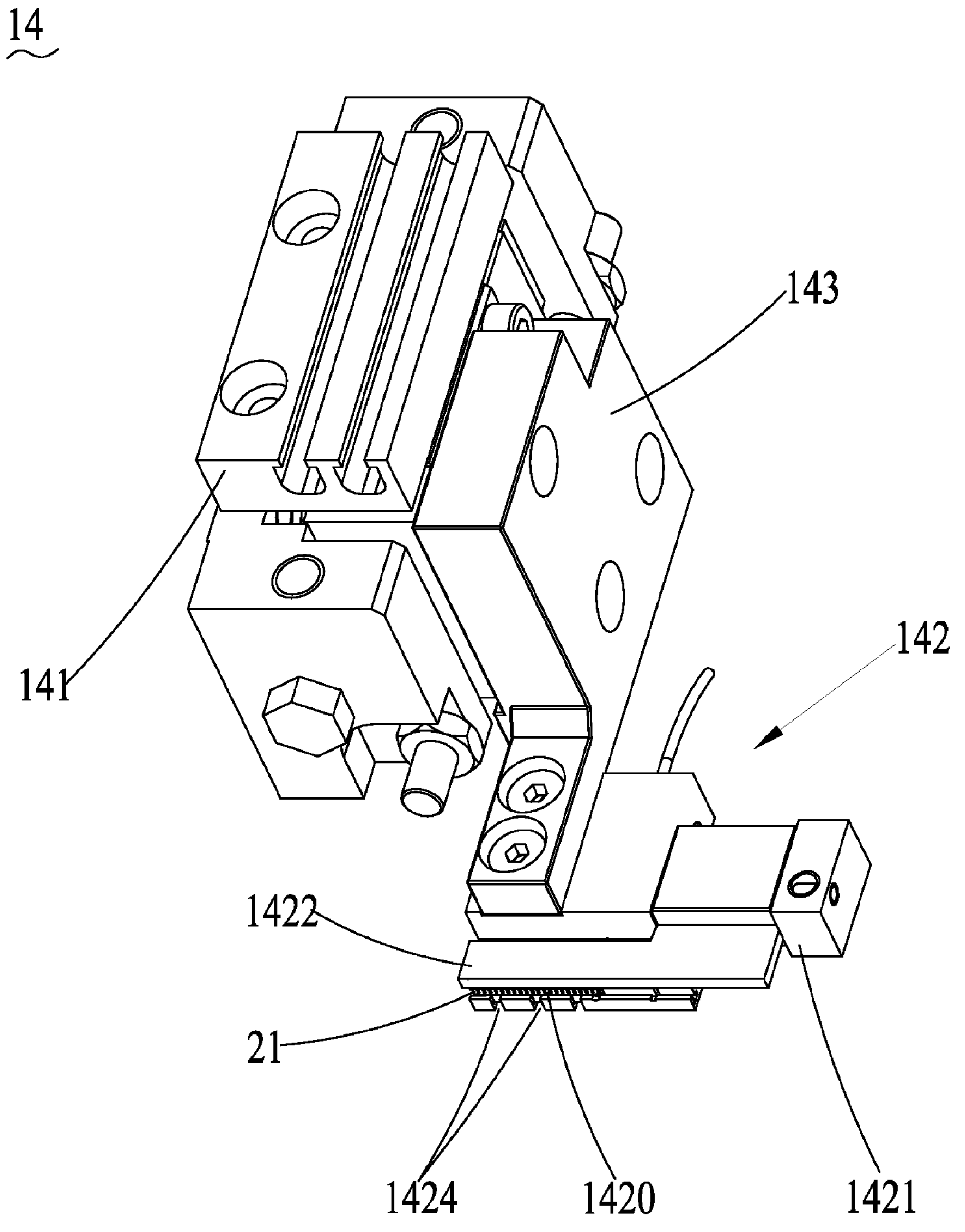
FIG. 4 is a perspective view of the separating mechanism of the connector cover assembling system shown in FIG. 1.
Figure 5:
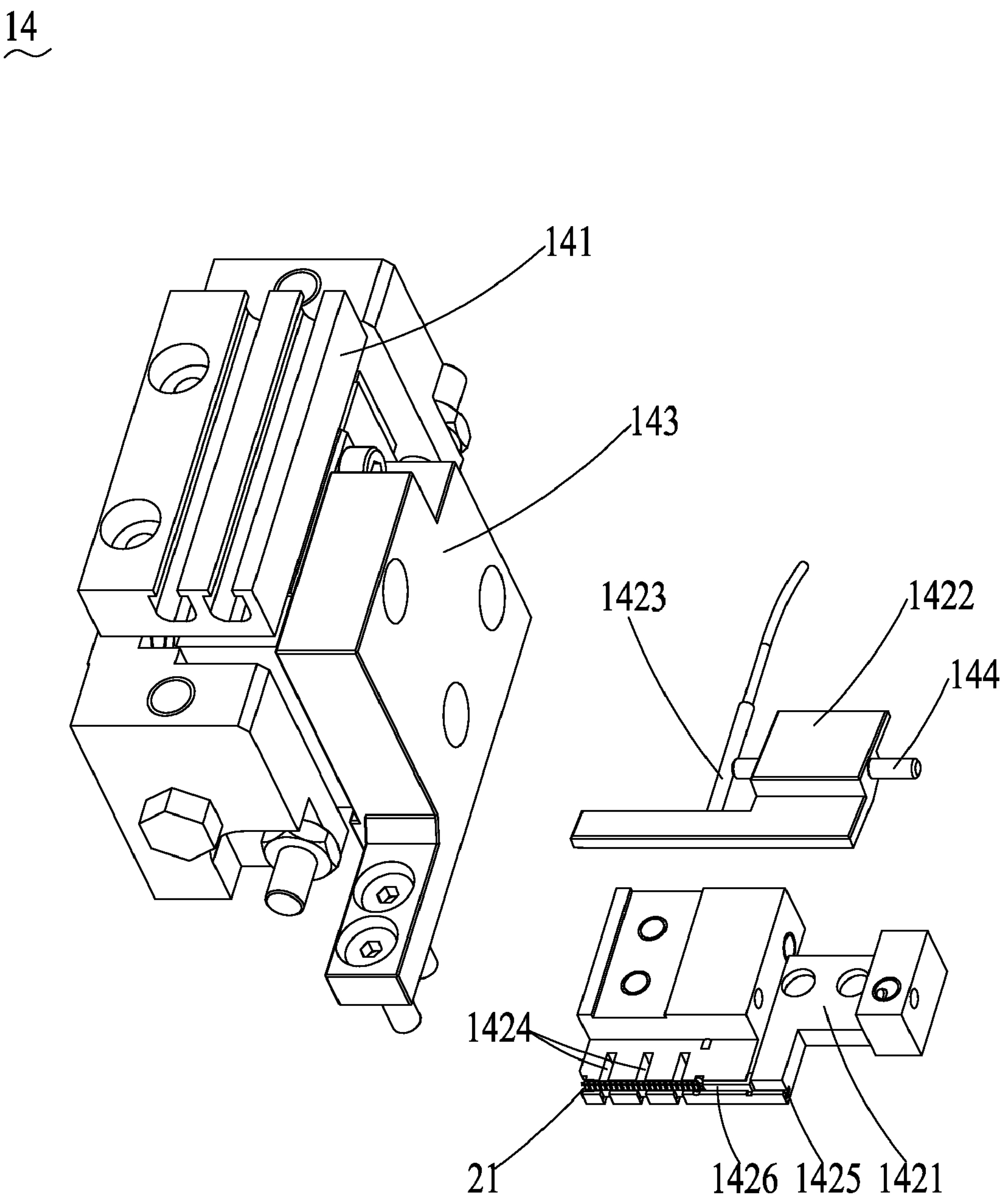
FIG. 5 is an exploded view of the separating mechanism shown in FIG. 4.
Figure 6:
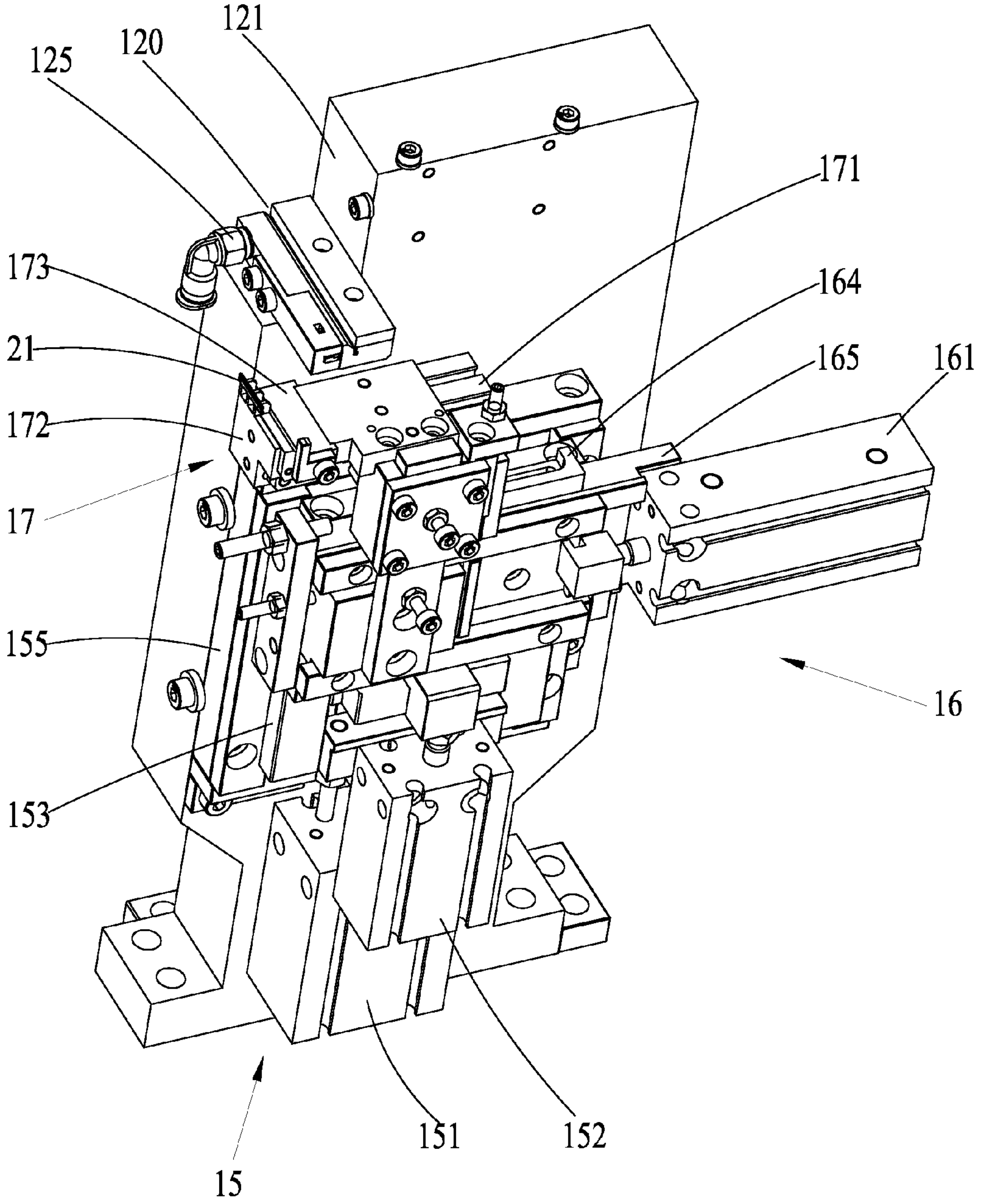
FIG. 6 is another perspective view of the connector cover assembling system shown in FIG. 1, wherein a clamping mechanism, a lifting mechanism, and an inserting mechanism are all mounted on the mounting panel.
Figure 7:
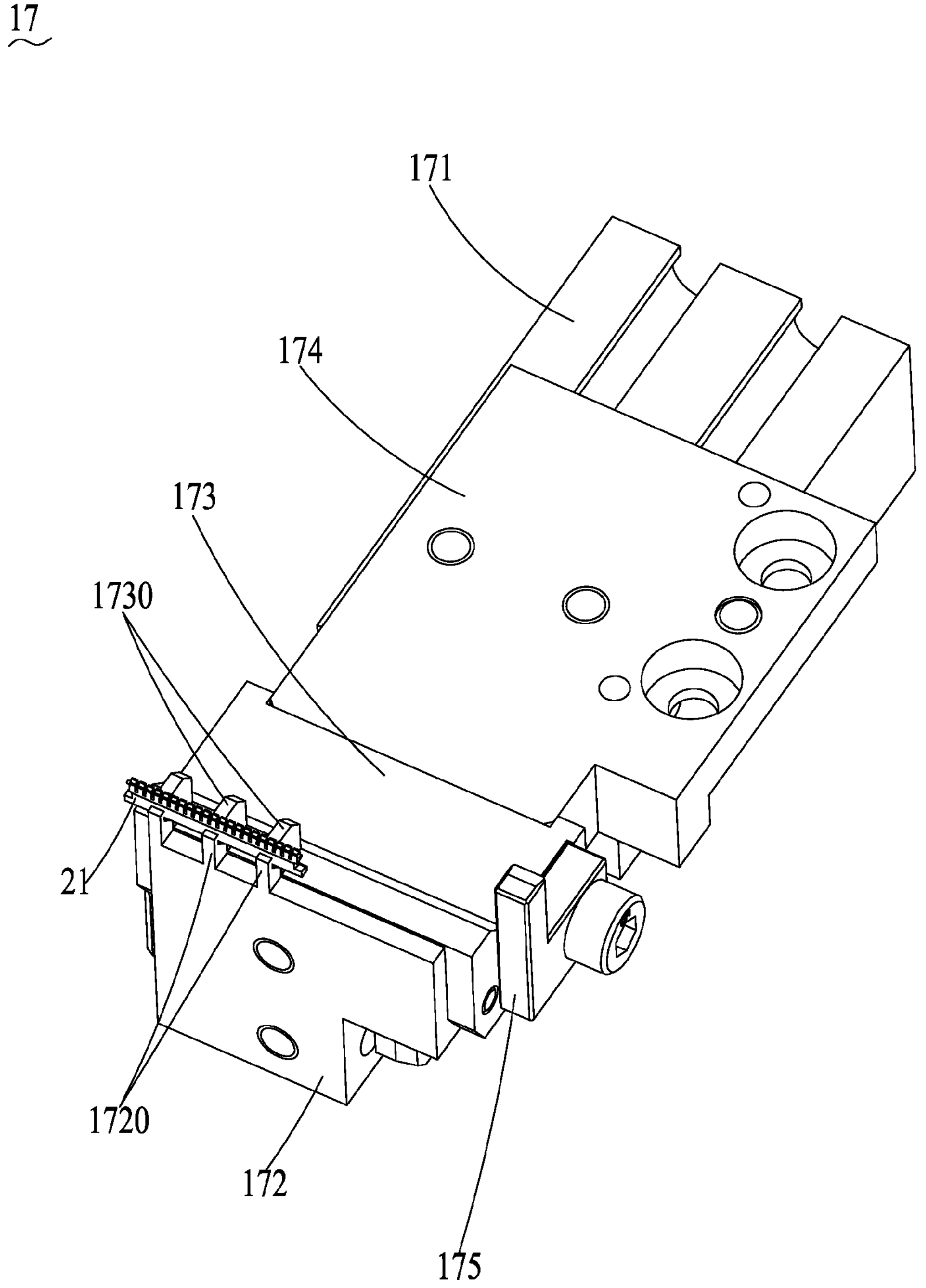
FIG. 7 is a perspective view of the clamping mechanism of the connector cover assembling system shown in FIG. 1.
Figure 8:
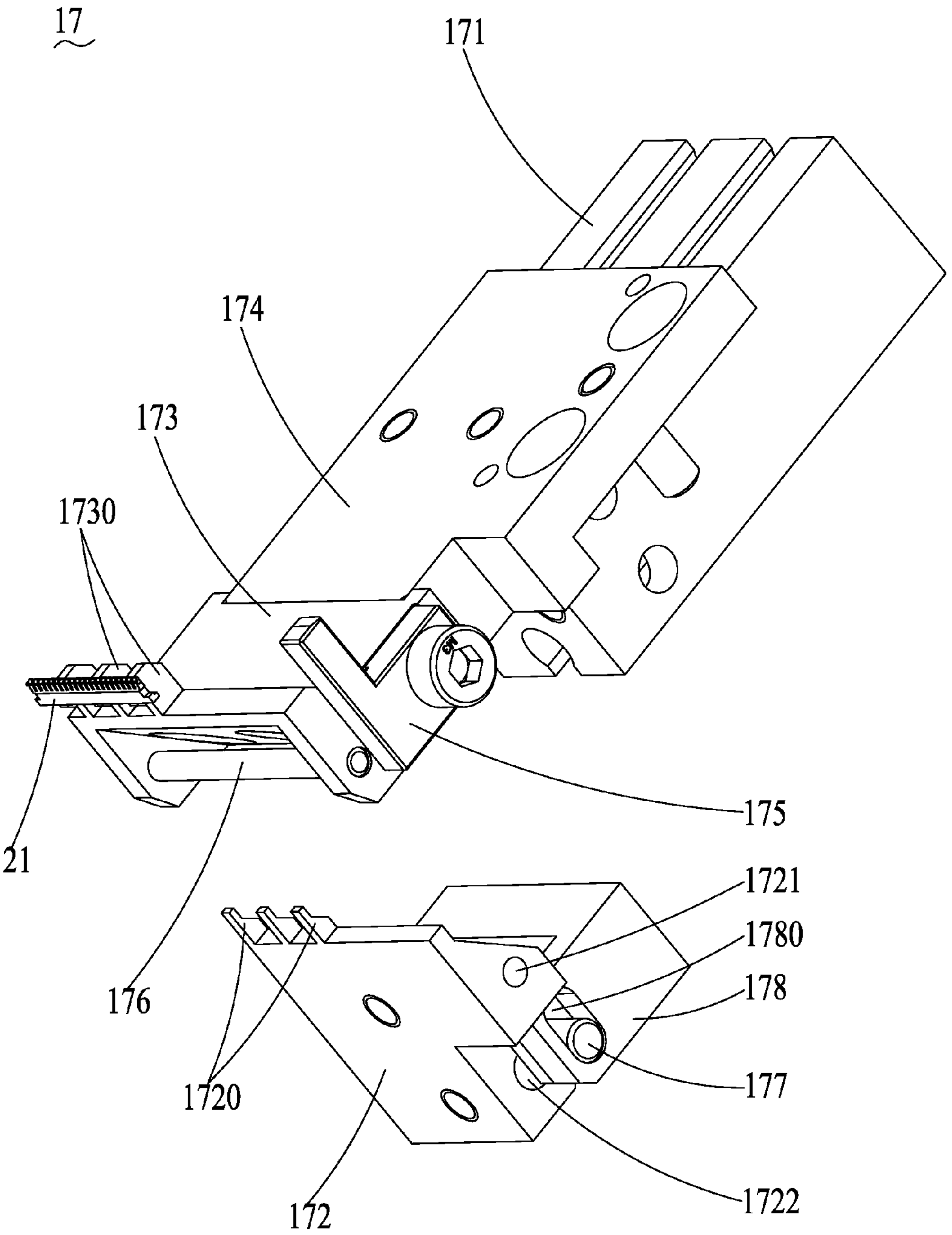
FIG. 8 is an exploded view of the clamping mechanism shown in FIG. 7.
Figure 9:
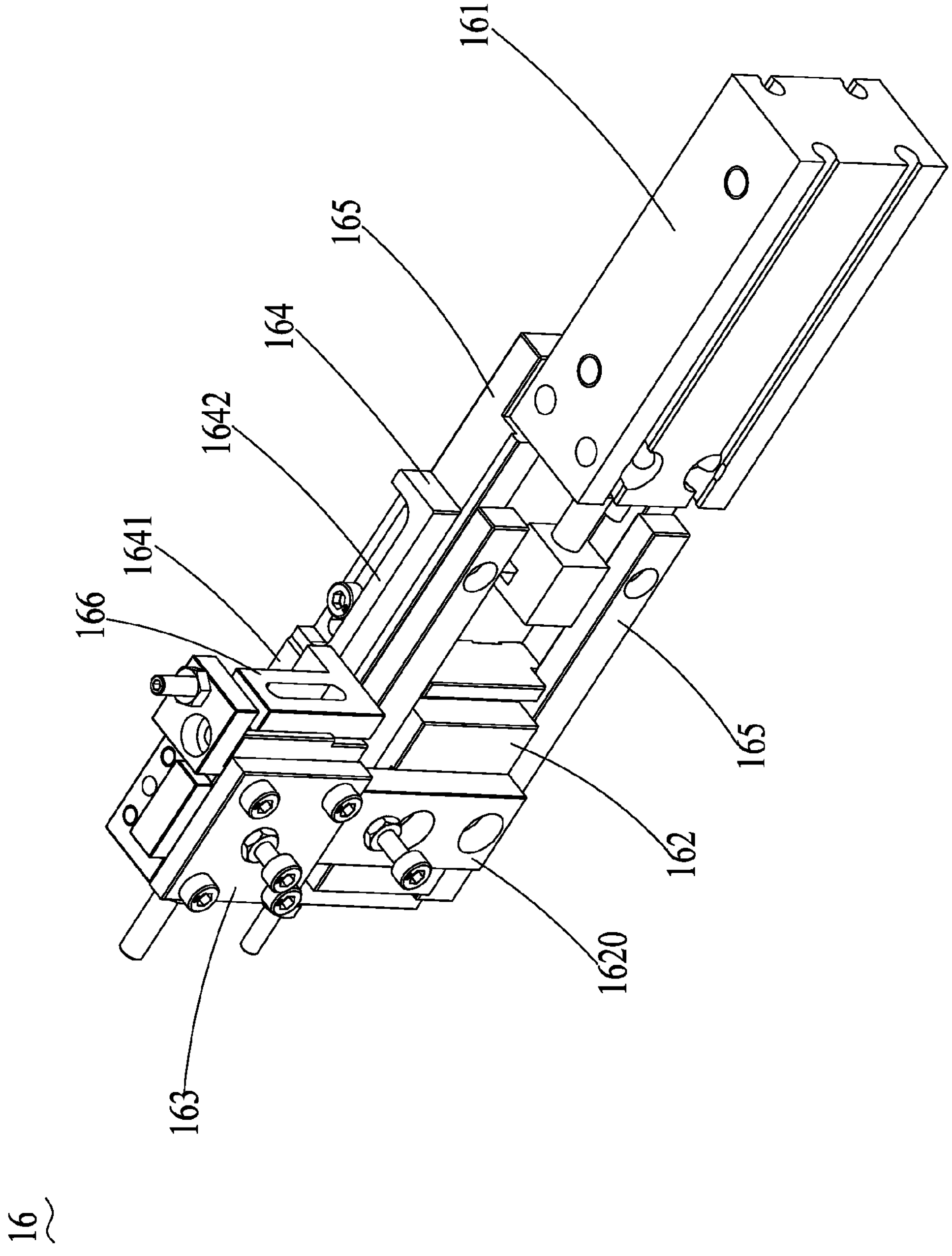
FIG. 9 is a perspective view of the inserting mechanism of the connector cover assembling system shown in FIG. 1.
Figure 10:
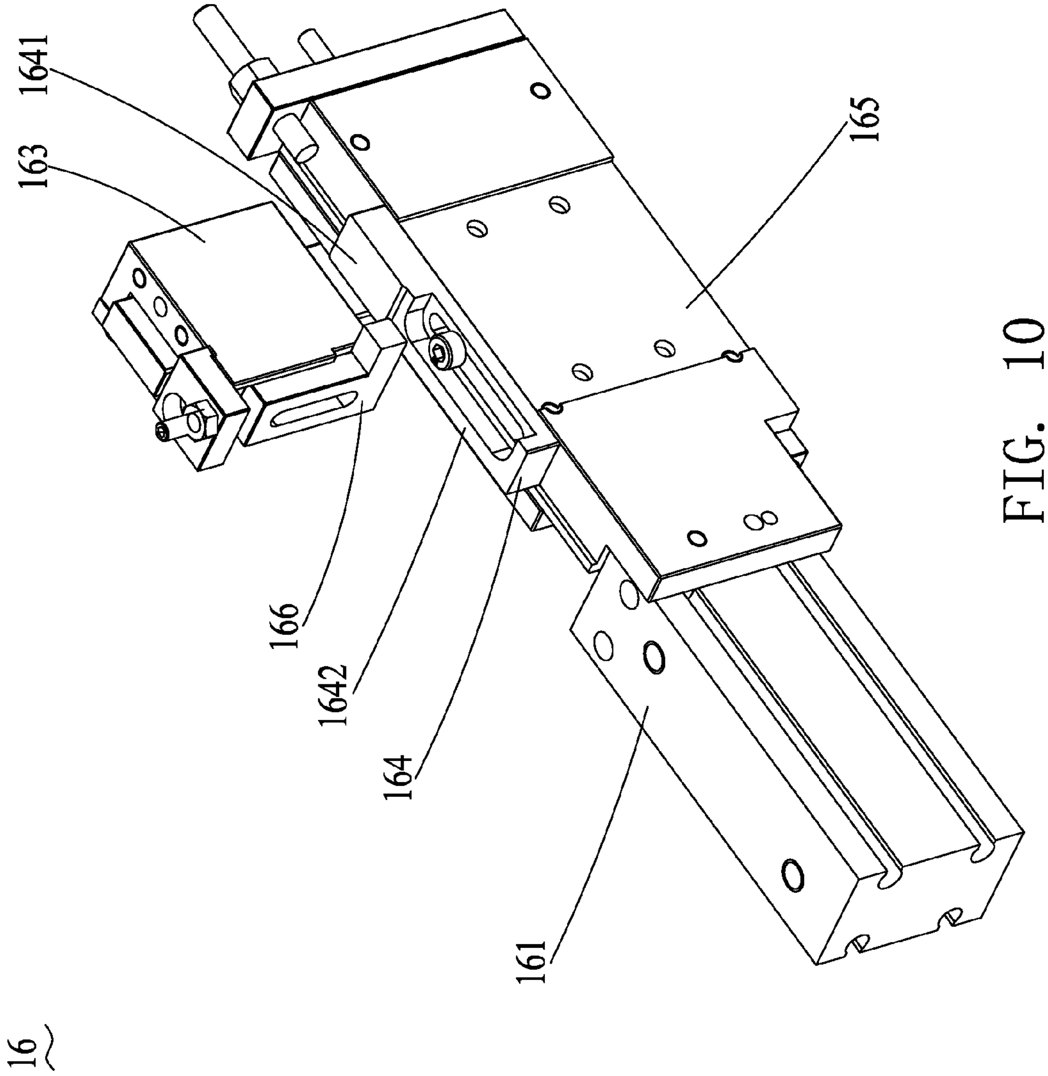
FIG. 10 is another perspective view of the inserting mechanism shown in FIG. 9.
Figure 11:
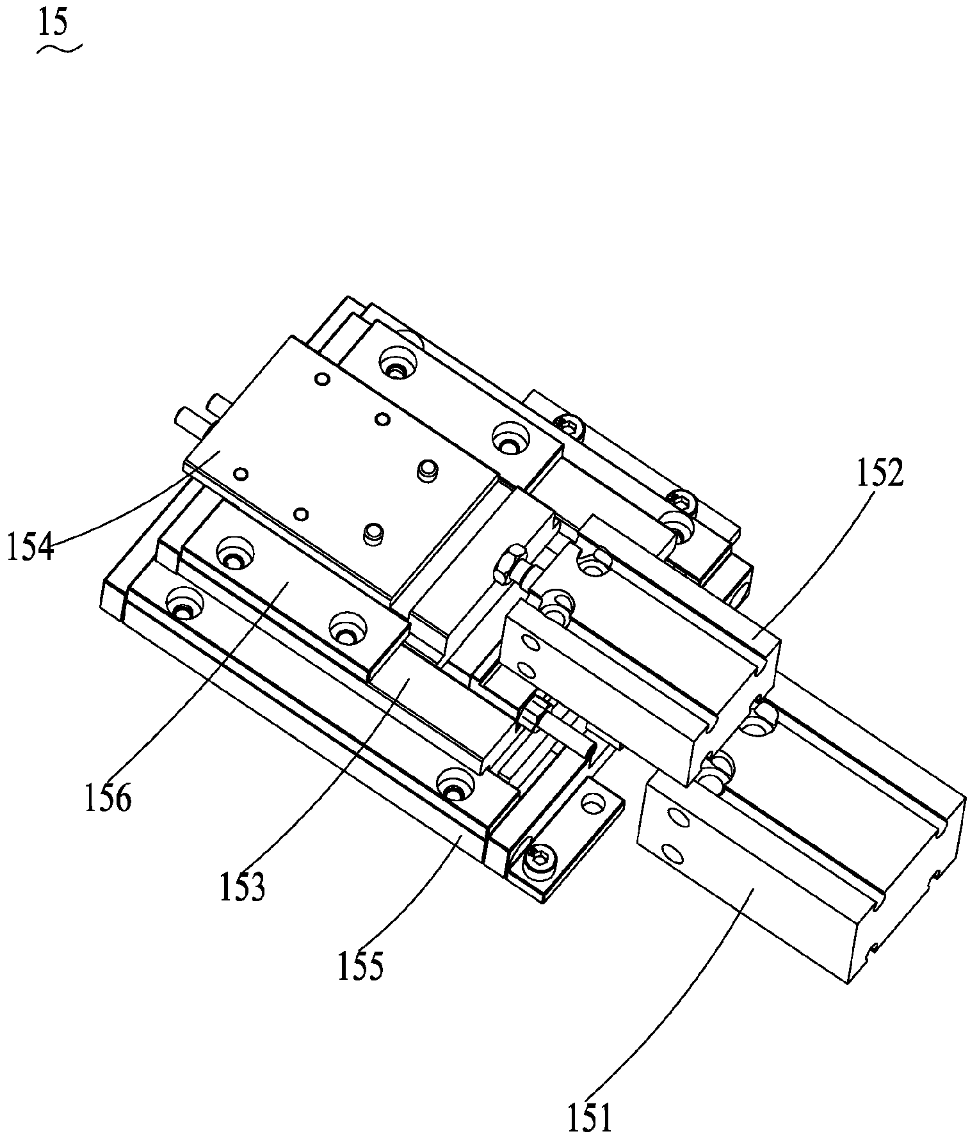
FIG. 11 is a perspective view of the lifting mechanism of the connector cover assembling system shown in FIG. 1.
Figure 12:
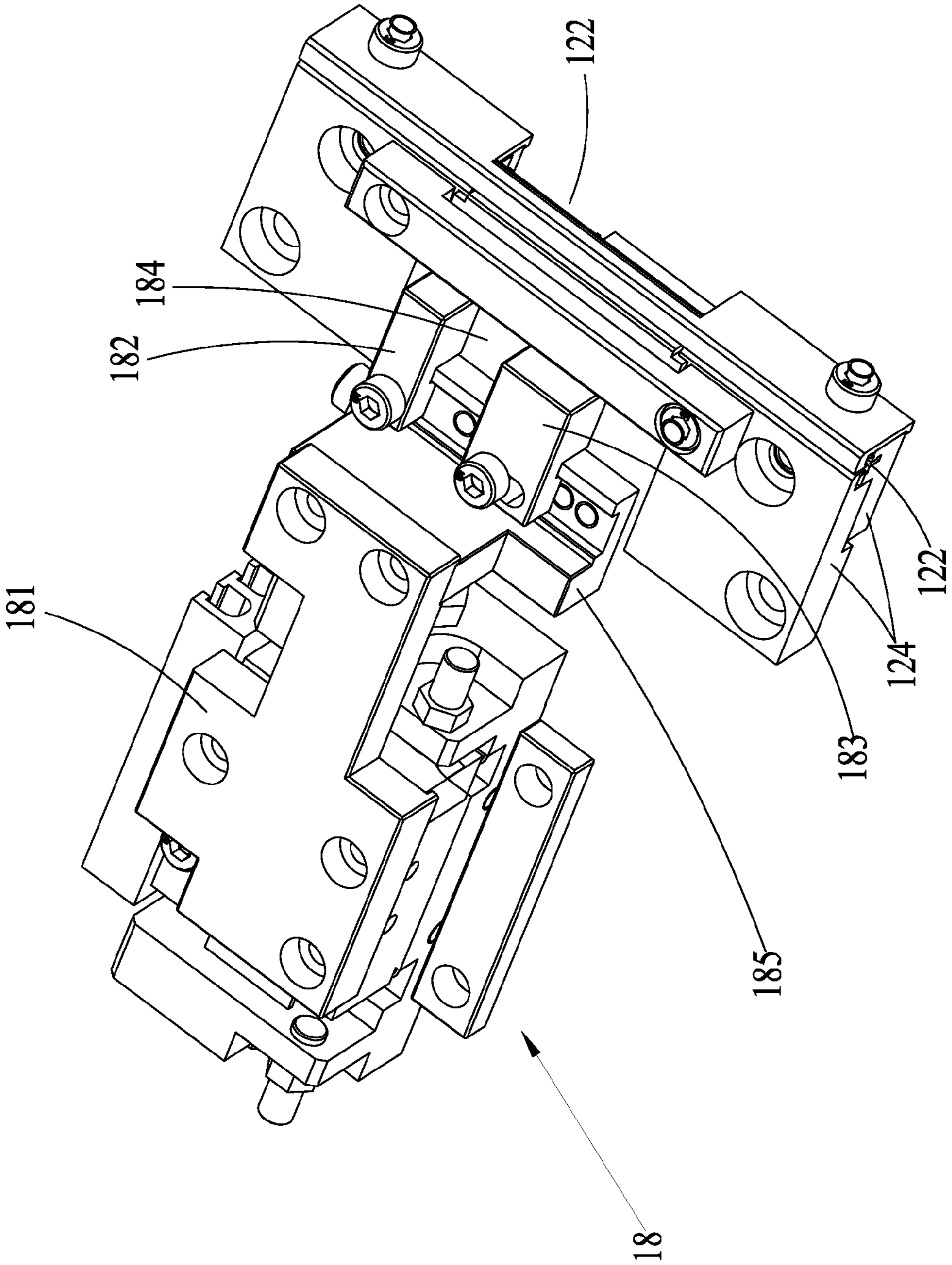
FIG. 12 is a perspective view of a holding mechanism and a frame of the connector cover assembling system shown in FIG. 1, wherein the holding mechanism is mounted on the frame.
Figure 13:
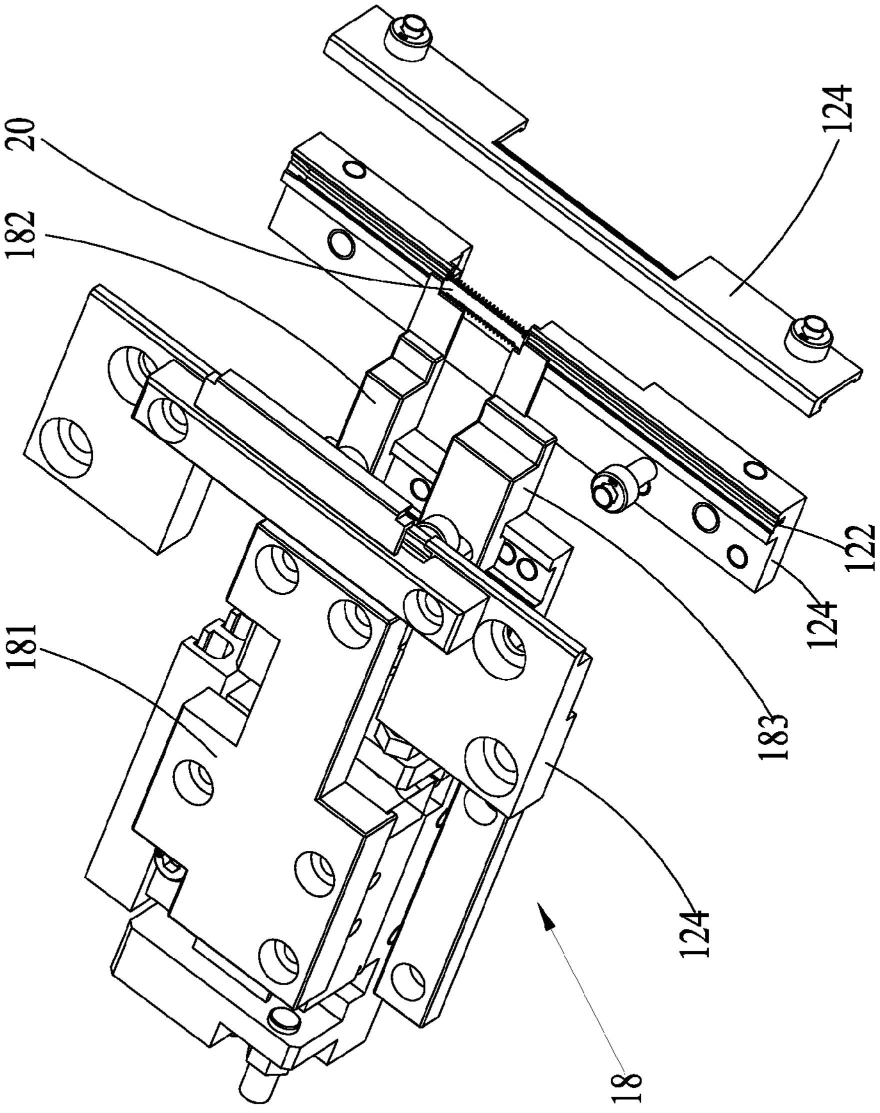
FIG. 13 is an exploded view of the holding mechanism shown in FIG. 12.
Figure 14:
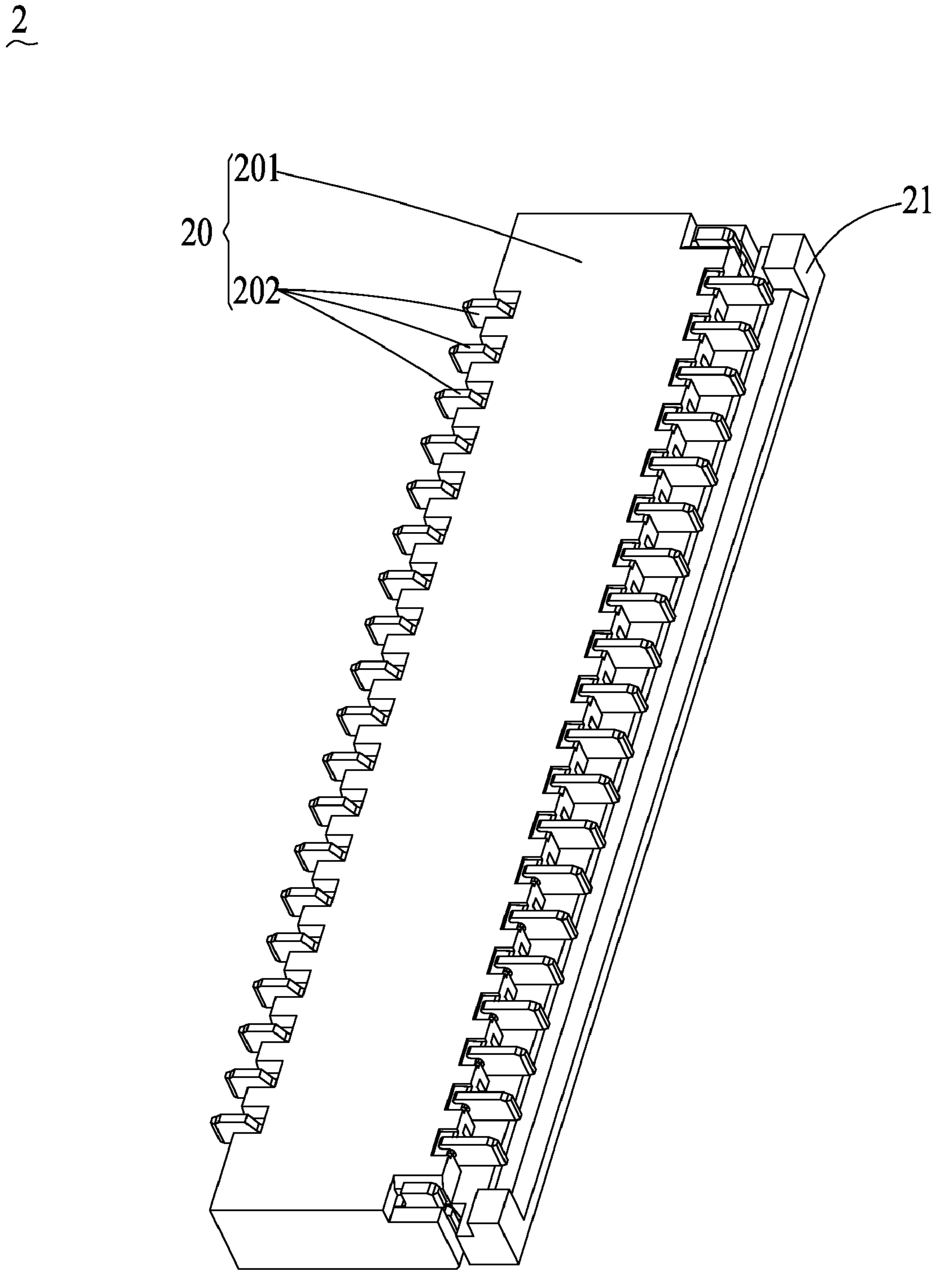
FIG. 14 is a perspective view illustrating a flexible printed circuit connector assembled by the connector cover assembling system shown in FIG. 1.

Referring to FIGS. 2, 6, and 11, the lifting mechanism 15 is located below the separating mechanism 14 and comprises a first lifting driver, a second lifting driver, a first lifting sliding plate 153, and a second lifting sliding plate 154. The first lifting sliding plate 153 and the second lifting sliding plate 154 collectively constitute a lifting sliding plate assembly. In the instant embodiment, the first lifting driver comprises a first lifting cylinder 151, and the second lifting driver comprises a second lifting cylinder 152. The first lifting cylinder 151 is mounted on a lower end of the mounting panel 121 through a first mounting pad 155 and connects with the first lifting sliding plate 153. The first lifting sliding plate 153 is mounted on the first mounting pad 155. The second lifting cylinder 152 is mounted on a lower end of the first lifting sliding plate 153 through a second mounting pad 156. The second lifting sliding plate 154 is mounted on the second mounting pad 156 and connects with the second lifting cylinder 152. When the first lifting cylinder 151 is actuated, the first lifting sliding plate 153 that connects with the first lifting cylinder 151 is driven to vertically and upwardly move on the first mounting pad 155. With the vertical and upward movement of the first lifting sliding plate 153, the second lifting cylinder 152 and the second lifting sliding plate 154, which are mounted on the first lifting sliding plate 153, are also moved vertically and upwardly. After the first lifting cylinder 151 upwardly moves to reach an extreme position, the second lifting cylinder 152 begins to upwardly move and drives the second lifting sliding plate 154 that connects with the second lifting cylinder 152 for further movement. In this way, a first positioning operation that sets the clamping mechanism 17 in a location to clamp and pick up a cover 21 from the separating mechanism 14, and a second positioning operation that moves and separates the clamped cover 21 from the separating mechanism 14 can both be realized.

Referring to FIGS. 2, 6, 9, and 10, the inserting mechanism 16 is positioned on the second lifting sliding plate 154 of the lifting sliding plate assembly and is located below the separating mechanism 14. The inserting mechanism 16 comprises an insertion driver, an insertion sliding plate 162, an insertion sliding base 163, and a cam plate 164. In the instant embodiment, the insertion driver comprises an insertion cylinder 161 and is retained on the second lifting sliding plate 154 of the lifting sliding plate assembly via an insertion cylinder mounting pad 165 and connects with the insertion sliding plate 162. The insertion sliding plate 162 comprises an end mounted on the insertion cylinder mounting pad 165. The insertion sliding plate 162 forms a guiding rail 1620 in an opposite end thereof. The guiding rail 1620 extends through the insertion sliding base 163 for guiding the insertion sliding base 163 to vertically move along the separating mechanism 14. The cam plate 164 is mounted on an upper end of the insertion cylinder mounting pad 165 and engages the insertion sliding base 163.

Specifically, the insertion sliding base 163 includes a top block 166 mounted on a side thereof. The top block 166 is L-shaped and engages the cam plate 164 for coordination of operations between the cam plate 164 and insertion sliding base 163. When the insertion cylinder 161 drives the insertion sliding plate 162 to horizontally move a specific distance along the mounting channel 122 of the frame, the cam plate 164 raises the insertion sliding base 163 upward in a curved path manner. In the embodiment illustrated, the cam plate 164 comprises a first engagement surface 1641 and a second engagement surface 1642. The first engagement surface 1641 and the second engagement surface 1642 are joined by such a curved transition (not shown) that the cam plate 164 is capable of raising the insertion sliding base 163 in a smooth and steady manner, whereby when the top block 166 slides along the second engagement surface 1642 of the cam plate 164 to reach the first engagement surface 1641, the top block 166 is raised by the cam plate 164 along a curved path. Since the insertion sliding base 163 and top block 166 are integrated together, the insertion sliding base 163 moves along a curved trace.

Referring to FIGS. 2, 6, 7 and 8, the clamping mechanism 17 is retained on the insertion sliding base 163 and is located below the separating mechanism 14. The clamping mechanism 17 comprises a clamping driver, a male clamp member 172, and a female clamp member 173 engaging the male clamp member 172. In the embodiment illustrated, the clamping driver is a clamping cylinder 171. The male clamp member 172 includes a male claw 1720 formed on a front end thereof and defines first and second mounting holes 1721 and 1722 therein. The female clamp member 173 includes a female claw 1730 formed on a front end thereof for mating the male claw 1720 of the male clamp member 172. The male claw 1720 cooperates with the female claw 1730 in clamping a cover 21. The clamping cylinder 171 is retained on a rear side of the insertion sliding base 163 through a clamp mounting pad 174. The clamping cylinder 171 is mounted on an end, which is away from the mounting channel 122 of the frame, of the clamp mounting pad 174. The female clamp member 173 is mounted on an opposite end, which is adjacent to the mounting channel 122 of the frame, of the clamp mounting pad 174 in such a way that the female clamp member 173 is in line with the clamping cylinder 171. A first clamping shaft 176 is received through the first mounting hole 1721 of the male clamp member 172 for pivoting an end of the male clamp member 172 to the female clamp member 173. A second clamping shaft 177 extends through the second mounting hole 1722 of the male clamp member 172 for pivoting another end of the male clamp member 172 to a clamping cylinder piston rod 178. The clamping cylinder piston rod 178 defines clamping sliding slots 1780 for facilitating slidable adjustment of the male clamp member 172. The clamping cylinder piston rod 178 connects with the clamping cylinder 171.

When the clamping cylinder 171 drives the male clamp member 172 to rotate with respect to the female clamp member 173, the male claw 1720 of the male clamp member 172 and the female claw 1730 of the female clamp member 173 clamp the cover 21 located in the separating mechanism 14 to prepare for assembling the cover 21 and a connector body 20 located in the mounting channel 122. In order to separate the male clamp member 172 and the female clamp member 173 of the clamping mechanism 17 from the separating mechanism 14 after they pick up the cover 21 from the separating mechanism 14, the female clamp member 173 includes an L-shaped clamping top block 175 mounted on a side thereof. When the clamping mechanism 17 which has clamped the cover 21 keeps on moving upwardly to disengage from the separating mechanism 14 in a vertical direction, the clamping top block 175, which is mounted on the side of the female clamp member 173, first contacts the upper hold-down plate 1422 of the separating mechanism 14 to push away the upper hold-down plate 1422, thereby separating the clamping mechanism 17 from the separating mechanism 14 to ensure that the clamping mechanism 17 is capable of steadily clamping the cover 21.

Referring to FIGS. 1, 2, 12, and 13, the holding mechanism 18 is positioned on the frame for holding the connector bodies 20 which are located in the mounting channel 122. The holding mechanism 18 has a holding driver and a holding member. In the embodiment illustrated, the holding driver comprises a holding cylinder 181. The holding member comprises a first holding block 182 and a second holding block 183. The holding cylinder 181 is mounted to an end of the first and second holding blocks 182, 183 through a holding cylinder piston rod 185. A holding gap 184 is defined between the first holding block 182 and the second holding block 183 at an opposite end thereof. When the holding cylinder 181 drives the first holding block 182 and the second holding block 183 to move within the mounting channel 122, the connector body 20 located in the frame will be received into and retained in the holding gap 184 to prepare for being assembled with the cover 21 clamped by the clamping mechanism 17.

The control unit electrically connects with the vibration plate 11, the high-pressure gas source, the separating cylinder 141, the sensor 1423, the first lifting cylinder 151, the second lifting cylinder 152, the insertion cylinder 161, the clamping cylinder 171, and the holding cylinder 181 respectively for coordinating movements/operations thereof.

With reference to the drawings, the operation of the connector cover assembling system 1 according to the present invention will be described in detail.

Firstly, the control unit actuates the vibration plate 11 to align disorderly covers 21 of the FPC connectors 2, which are pre-loaded in the vibration plate 11, and then transport ordered covers 21 one by one to the supporting channel 120 of the frame via the transporting channel of the transporting shelf 110. After the supporting channel 120 receives the covers 21, the control unit actuates the high-pressure gas source to provide high pressure gas to the supporting channel 120, which is adjacent to the end of the transporting shelf 110, through a gas input pipe 125. The high-pressure gas drives the covers 21 in the supporting channel 120 to move within the supporting channel 120 and sequentially transports the covers 21 to the receiving space 1420 defined between the lower baffle plate 1421 and the upper hold-down plate 1422 of the separating mechanism 14.

The sensor 1423 of the separating mechanism 14 detects the position of the sequentially supplied covers 21. When one of the covers 21 is transported to a predetermined position in the separating mechanism 14, the sensor 1423 feeds back a signal to the control unit and the control unit controls the separating cylinder 141 of the separating mechanism 14, so that the separating mechanism body 142, which is composed of the lower baffle plate 1421, the upper hold-down plate 1422, the elastic element, and the sensor 1423, is driven to horizontally move along the mounting channel 122 of the frame until the separating mechanism body 142 is located above the clamping mechanism 17 for facilitating the clamping mechanism 17 clamping and picking up the cover 21 from the separating mechanism 14. The elastic pressing plate 123 of the frame elastically depresses one side of the cover 21, thereby stably retaining the cover 21 in position.

Then, the control unit actuates the first lifting cylinder 151 of the lifting mechanism 15 so as to drive the first lifting cylinder 151, which is connected to the first lifting cylinder 151, to upwardly move along the separating mechanism 14, thereby lifting both the inserting mechanism 16 and the clamping mechanism 17 upwardly. When the first lifting cylinder 151 upwardly moves to the extreme position thereof, the male clamp member 172 and the female clamp member 173 of the clamping mechanism 17 move to a location just above the cover 21 in the separating mechanism 14. The control unit controls the clamping cylinder 171 of the clamping mechanism 17 so that the clamping cylinder piston rod 178 which connects with the clamping cylinder 171 is driven to move in such a direction that a distance between the male clamp member 172 and the female clamp member 173 is enlarged. As a result, the male clamp member 172 pivoted to the clamping cylinder piston rod 178 is driven to rotate with respect to the first clamping shaft 176, so that the distance between the male claw 1720 of the male clamp member 172 and the female claw 1730 of the female clamp member 173 is enlarged enough to accommodate the cover 21.

When the cover 21 is received between the male claw 1720 of the male clamp member 172 and the female claw 1730 of the female clamp member 173, the control unit controls the clamping cylinder 171 to move in such an opposite direction that the cover 21 is clamped steadily between the male claw 1720 of the male clamp member 172 and the female claw 1730 of the female clamp member 173. Then, the control unit controls the second lifting cylinder 152 of the lifting mechanism 15 to move upwardly, thereby driving the second lifting sliding plate 154 that connects with the second lifting cylinder 152 to further move upwardly. As a result, the inserting mechanism 16 and the clamping mechanism 17, which are mounted on the second lifting sliding plate 154, are driven to further move upwardly with the movement of the second lifting sliding plate 154. During the upward movement, the clamping mechanism 17 utilizes the L-shaped clamping top block 175 to push away the upper hold-down plate 1422 of the separating mechanism 14 to allow the male clamp member 172 and the female clamp member 173 to separate from the separating mechanism 14 so as to ensure that the clamping mechanism 17 is capable of steadily clamping and moving the cover 21 away from the separating mechanism 14.

Figure 15:
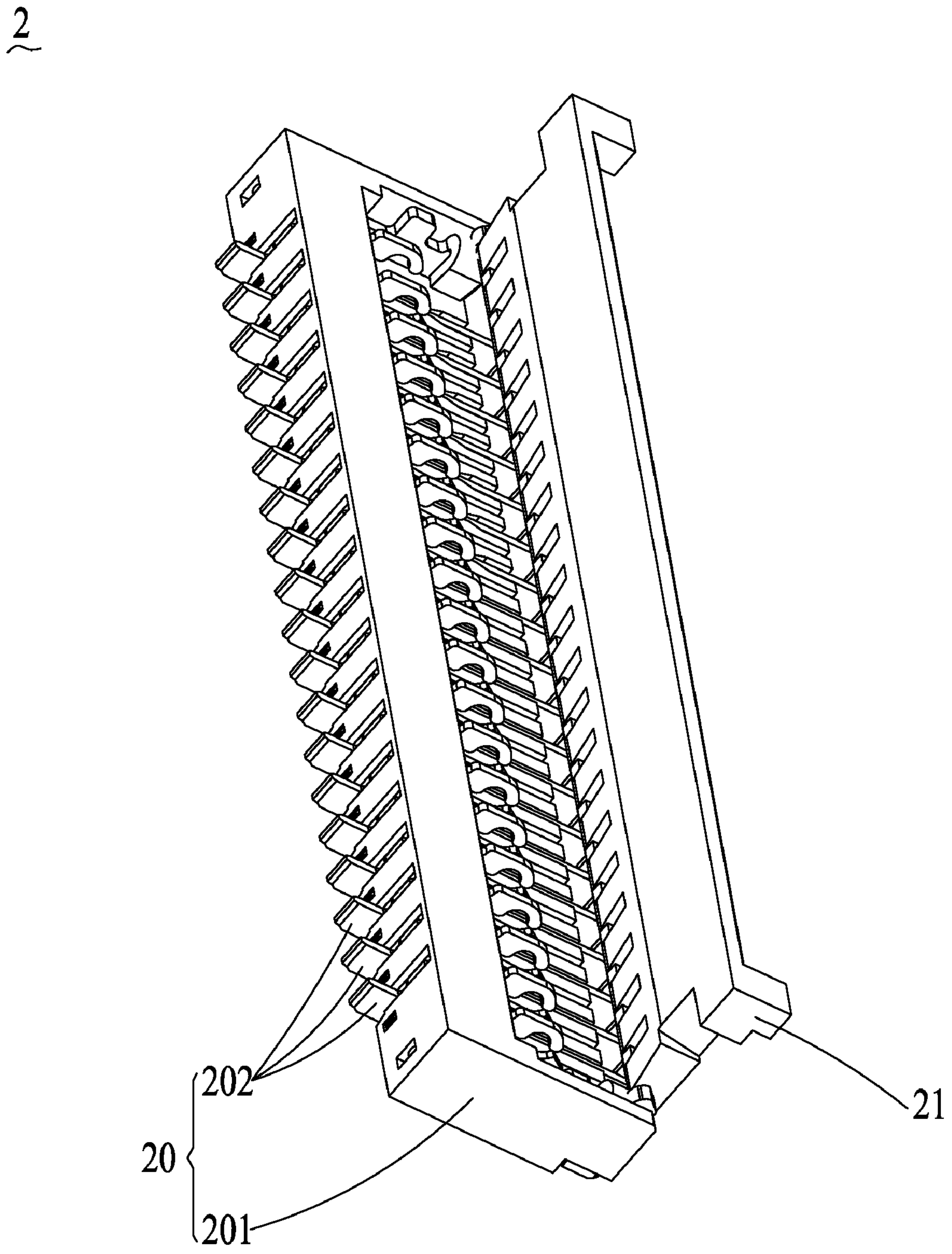
FIG. 15 is another perspective view of the flexible printed circuit connector assembled by the connector cover assembling system shown in FIG. 1, wherein the flexible printed circuit connector is under an assembling process.
Figure 16:
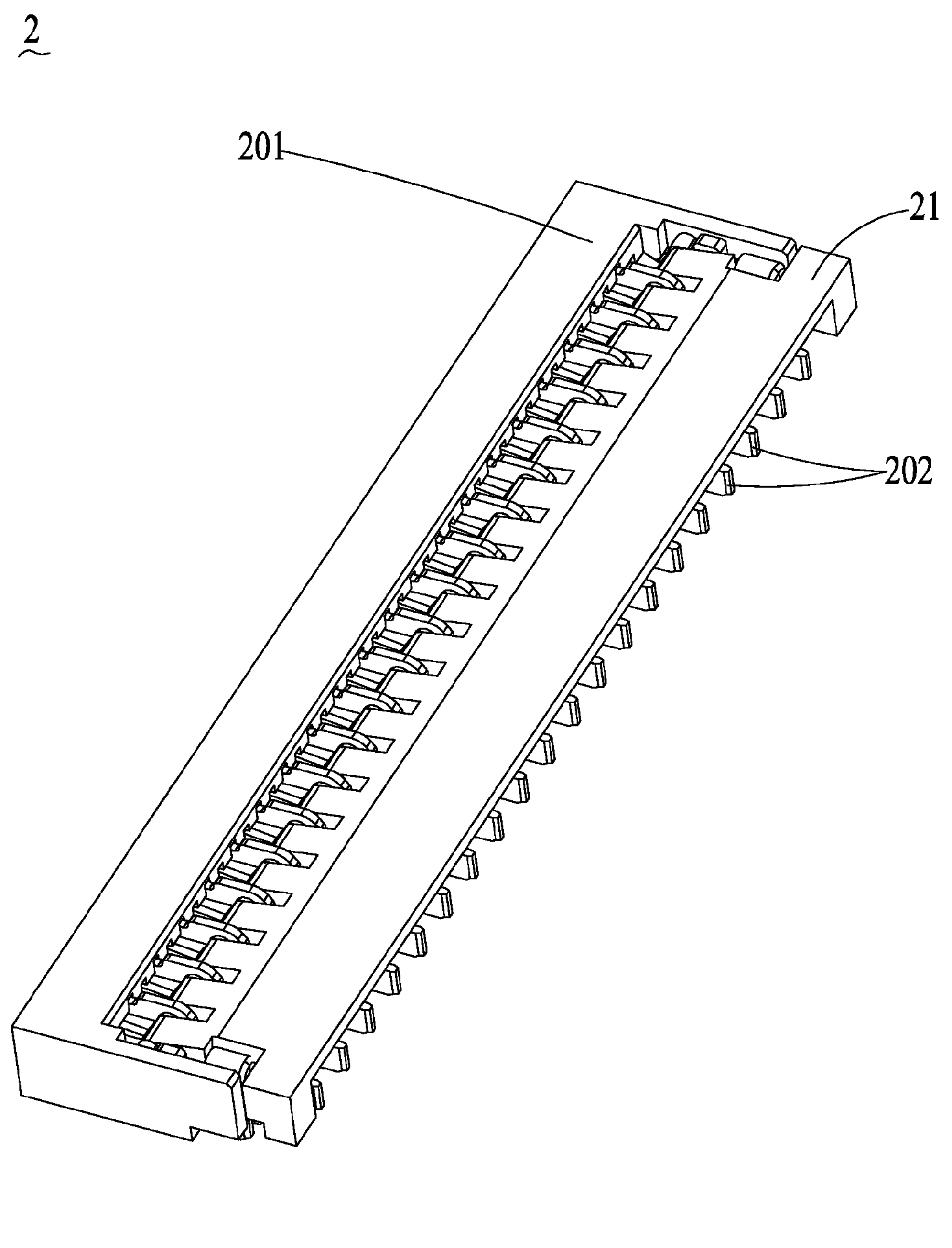
FIG. 16 is another perspective view of the flexible printed circuit connector assembled by the connector cover assembling system shown in FIG. 1, wherein the flexible printed circuit connector is completely assembled.

Lastly, after the clamping mechanism 17 is separated from the separating mechanism 14, the control unit controls the insertion cylinder 161 of the inserting mechanism 16 to drive the insertion sliding plate 162, which is connected to the insertion cylinder 161, to move toward the mounting channel 122 of the frame. The moving insertion sliding plate 162 drives the insertion sliding base 163 to move. With the movement of the insertion sliding base 163, the clamping mechanism 17, which is mounted on the insertion sliding base 163, is driven to move synchronously. Since the insertion sliding plate 162 extends through the insertion sliding base 163 via the guiding rail 1620, the insertion sliding base 163 not only can synchronously move with the movement of the insertion sliding plate 162 along the mounting channel 122 of the frame, but is also movable in vertical direction of the insertion sliding plate 162. When the inserting mechanism 16 drives the clamping mechanism 17 to move to a location just below the mounting channel 122 of the frame, the top block 166 that engages the cam plate 164 just moves from the second engagement surface 1642 to the first engagement surface 1641, thereby lifting the insertion sliding base 163, which is integrated with the top block 166. Meanwhile, since the clamping mechanism 17 is retained on the insertion sliding base 163, the clamping mechanism 17 moves in a curved path. Consequently, the cover 21, which is clamped between the male clamp member 172 and the female clamp member 173, is moved in a curved path to rapidly insert into and mount to the connector body 20, as shown in FIG. 15 that illustrates the condition where the connector body 20 and the cover 21 are coupled to each other, thereby improving assembling efficiency and ensuring firm assembled result of the connector 2. After the cover 21 is inserted into the connector body 20, the control unit controls the clamping cylinder 171 to move along a horizontal direction of the mounting channel 122 of the frame, thereby driving the male clamp member 172 to rotate with respect to the female clamp member 173. As a result, the cover 21 is mounted on the connector body 20 and automatic assembling of the connector 2 is thus realized. An assembled connector 2 is shown in FIG. 16.

As stated previously, the connector cover assembling system 1 according to the present invention utilizes the vibration plate 11 to arrange and align disorderly covers 21 of FPC connectors 2 and then transports the ordered covers 21 of the connectors 2 to the frame. Afterwards, a gas stream of high-pressure gas source drives the covers 21 in the frame to further move to the separating mechanism 14. The separating mechanism 14 sequentially transports the covers 21 to a location above the clamping mechanism 17. Then, the lifting mechanism 15 drives both the inserting mechanism 16 and the clamping mechanism 17 to move therewith along the separating mechanism 14. The clamping mechanism 17 clamps and picks up the cover 21 located in the separating mechanism 14. Finally, the holding mechanism 18 securely holds a connector body 20 located in the frame. The inserting mechanism 16 drives the clamping mechanism 17 to the cover 21 in a curved path for rapidly mounting to the connector body 20 in the frame, thereby steadily and reliably mounting the cover 21 to the connector body 20. Therefore, the connector cover assembling system 1 according to the present invention is capable of improving manufacturing efficiency and decreasing manufacturing costs. Besides, the connectors assembled by the connector cover assembling system are reliable and of consistent quality.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A connector cover assembling system adapted to assemble a cover to a connector body of a flexible printed circuit connector, the connector cover assembling system comprising:

an arrangement apparatus, which is adapted to receive and arrange a plurality of covers, the arrangement apparatus comprising a transporting channel for transporting the covers;

a frame, which comprises a mounting panel, a supporting channel for carrying and supporting the covers, and a mounting channel for carrying supporting a connector body, the supporting channel being located on a side of the mounting panel and engaging the transporting channel for transporting the covers from the arrangement apparatus to the supporting channel of the frame, the mounting channel being located adjacent to the supporting channel and being substantially perpendicular to the mounting panel;

a cover driving member;

a separating mechanism, which comprises a separating driver and a separating mechanism body, the separating mechanism body defining a receiving cavity in an end thereof for jointing the supporting channel, the cover driving member driving the covers received in the supporting channel to move from the supporting channel toward the receiving cavity one by one, the separating mechanism body having an opposite end connecting with the separating driver, the separating driver being mounted on an upper end of the mounting panel and driving the separating mechanism body to horizontally move along the mounting channel of the frame;

a lifting mechanism, which is located below the separating mechanism, the lifting mechanism comprising a first lifting driver and a lifting sliding plate assembly, the first lifting driver being mounted on a lower end of the mounting panel and connecting with the lifting sliding plate assembly, the lifting sliding plate assembly being positioned on the mounting panel, the first lifting driver driving the lifting sliding plate assembly to vertically move along the separating mechanism;

an inserting mechanism, which is positioned on the lifting sliding plate assembly and is located below the separating mechanism, the inserting mechanism comprising an insertion driver, an insertion sliding plate, an insertion sliding base, and a cam plate, the insertion driver being retained on the lifting sliding plate assembly and connect with the insertion sliding plate, the insertion sliding plate having an end mounted on the lifting sliding plate assembly and an opposite end extending through the insertion sliding base for guiding the insertion sliding base to vertically move along the separating mechanism, the cam plate being mounted on the lifting sliding plate assembly and engaging the insertion sliding base, wherein when the insertion driver drives the insertion sliding plate to horizontally move a specific distance along the mounting channel of the frame, the cam plate lifts the insertion sliding base along a curved path;

a clamping mechanism, which is retained on the insertion sliding base of the inserting mechanism and is located below the separating mechanism, the clamping mechanism comprising a clamping driver, a male clamp member and a female clamp member mating the male clamp member, the clamping driver being mounted on an end of the insertion sliding base, the female clamp member mounted on an opposite end of the siding base, the male clamp member having an end pivoted to the female clamp member and another end connected to the clamping driver, the clamping driver driving the male clamp member to rotate with respect to the female clamp member in order to clamp the cover located in the separating mechanism and for assembling the cover to the connector body located in the mounting channel;

a holding mechanism, which is positioned on the frame to hold the connector body located in the mounting channel, the holding mechanism comprising a holding driver and a holding member, the holding driver connecting with an end of the holding member, the holding member defining a holding gap in an opposite end thereof, the holding driver driving the holding member to move within the mounting channel, the holding gap of the holding member retaining the connector body, whereby the connector body is assembled with the cover clamped by the clamping mechanism; and a control unit, which is electrically connected to the arrangement apparatus, the cover driving member, the separating driver, the first lifting driver, the insertion driver, the clamping driver, and the holding driver.

2. The connector cover assembling system of claim 1, wherein the lifting mechanism comprises a second lifting driver, the lifting sliding plate assembly comprising a first lifting sliding plate and a second lifting sliding plate, the first lifting driver connecting with the first lifting sliding plate, the first lifting sliding plate being arranged on the mounting panel and vertically movable along the mounting panel, the second lifting driver being mounted on the first lifting sliding plate and connecting with the second lifting sliding plate, the second lifting sliding plate being arranged on the first lifting sliding plate and vertically movable along the first lifting sliding plate, the inserting mechanism being mounted on the second lifting sliding plate.

3. The connector cover assembling system of claim 1, wherein the cam plate comprises a first engagement surface and a second engagement surface, the first engagement surface and the second engagement surface being joined by a curved transition, whereby when the insertion sliding base slides from the second engagement surface of cam plate to the first engagement surface, the insertion sliding base is lifted by the cam plate along a curved path.

4. The connector cover assembling system of claim 1, wherein the separating mechanism comprises a lower baffle plate, an upper hold-down plate, an elastic element, and a sensor, the lower baffle plate defining a receiving cavity in a side surface of an end thereof corresponding to the supporting channel of the frame, the lower baffle plate having an opposite end securely connecting with the separating driver, the upper hold-down plate having an end pivoted to the lower baffle plate and an opposite end positionable on the receiving cavity of the lower baffle plate, thereby defining a receiving space, the elastic element being positioned between the upper hold-down plate and the lower baffle plate, the sensor being positioned on the receiving space and electrically connecting with the control unit, the lower baffle plate defining clamping passages through which the male clamp member and the female clamp member hold the cover, the clamping passages being in communication with the receiving cavity.

5. The connector cover assembling system of claim 1, wherein the frame comprises an elastic pressing plate, which is substantially parallel to the supporting channel of the frame and is located between the supporting channel and the mounting panel, the elastic pressing plate having an end pivoted to the mounting panel of the frame and an opposite end extending outside the mounting panel to elastically engage and securely hold a side of the cover transported from the separating mechanism.

6. The connector cover assembling system of claim 1, wherein the cover driving member comprises a high-pressure gas source, which comprises an input end in communication with the supporting channel which is adjacent to the transporting channel.

7. The connector cover assembling system of claim 1, wherein the holding member comprises a first holding block and a second holding block, which are substantially parallel to each other and coupled to the holding driver, the first holding block and the second holding block defining a holding gap therebetween.

8. The connector cover assembling system of claim 1, wherein the arrangement apparatus comprises a vibration plate.

* * * * *